United States Patent [19]

Dean

[11] Patent Number: 4,782,122

[45] Date of Patent: Nov. 1, 1988

[54] IMPACT MODIFIER FOR IMIDE CONTAINING COPOLYMERS

[75] Inventor: Barry D. Dean, Broomall, Pa.

[73] Assignee: Arco Chemical Company, Newtown Square, Pa.

[21] Appl. No.: 50,106

[22] Filed: May 15, 1987

Related U.S. Application Data

[62] Division of Ser. No. 895,990, Aug. 14, 1986, Pat. No. 4,703,085.

[51] Int. Cl.$^4$ ................................................ C08F 8/30
[52] U.S. Cl. ...................................... 525/375; 525/375
[58] Field of Search ........................................... 525/375

[56] References Cited

U.S. PATENT DOCUMENTS 4,186,191  1/1980  Chamberlin et al. ............... 424/78
4,261,925  4/1981  Tomalia et al. ..................... 252/355

OTHER PUBLICATIONS

Macromolecules, vol. 6, No. 6, Nov–Dec. 1973, pp. 805–808 "Preparation of Block Copolymer of 2-Oxazoline and Butadiene", Saegusa et al.

Primary Examiner—John C. Bleutge
Assistant Examiner—A. Carrillo
Attorney, Agent, or Firm—Dennis M. Kozak

[57] ABSTRACT

An A-B-A triblock copolymer particularly suitable for use as an impact modifier for thermoplastic molding compositions containing an imide containing copolymer is disclosed. Molded compositions of the invention exhibit excellent impact strength and heat resistance and are transparent.

9 Claims, No Drawings

IMPACT MODIFIER FOR IMIDE CONTAINING COPOLYMERS

This is a division of application Ser. No. 06/895,990, filed Aug. 14, 1986, now U.S. Pat. No. 4,703,085.

This invention relates to thermoplastic molding compositions.

More specifically, this invention relates to a novel composition of matter particularly suitable for use as an impact modifier for thermoplastic molding compositions.

In one of its more specific aspects, this invention relates to moldable compositions based on imide containing copolymers impact modified with triblock copolymers having poly(2-alkyl-2-oxazoline) end blocks and a polyisobutylene midblock.

Thermoplastic molding compositions based on nitrile/vinyl aromatic/maleimide interpolymers rubber modified with a diene elastomer are described in U.S. Pat. No. 3,721,724. Rubber modified styrene/maleimide copolymers wherein the rubber can be a conjugated 1,3 diene rubber, a styrene-diene rubber, an acrylonitrile-diene rubber, an EPDM rubber, and an acrylate-diene rubber, and their mixtures are also known and taught in U.S. Pat No. 3,998,907.

Applicant herein has found that the incorporation of an A-B-A triblock copolymer having poly(2-alkyl-2-oxazoline) end or A blocks and a polyisobutylene mid- or B block into an imide containing copolymer wherein the recurring units of the imide monomer (e.g., maleimide) each bear an active hydrogen having a pKa of less than about 11, increases the impact strength while maintaining the high heat resistance of the copolymer upon molding. Quite surprisingly, Applicant found that upon molding the moldable compositions of this invention are transparent.

According to this invention, there is provided an A-B-A triblock copolymer wherein A represents poly(2-alkyl-2-oxazoline) end blocks and B represents a polyisobutylene midblock.

In one preferred embodiment, the triblock copolymer is poly(2-methyl-2-oxazoline)-b-polyisobutylene-b-poly(2-methyl-2-oxazoline).

In another preferred embodiment, the triblock copolymer is poly(2-ethyl-2-oxazoline)-b-polyisobutylene-b-poly(2-ethyl-2-oxazoline).

In yet another preferred embodiment, the triblock copolymer is poly(2-propyl-2-oxazoline)-b-polyisobutylene-b-poly(2-propyl-2-oxazoline).

According to this invention, there is also provided an impact strength modifier for thermoplastic compositions which comprise copolymers having recurring units of imide monomer each bearing an active hydrogen having a pKa value of from about 4 to about 11, said impact modifier being an A-B-A triblock copolymer, wherein A represents poly(2-alkyl-2-oxazoline) end blocks and B represents a polyisobutylene midblock.

Also according to this invention, there is provided a method of enhancing the impact strength properties of a thermoplastic composition comprising a copolymer having recurring units of an imide monomer bearing an active hydrogen having a pKa value from about 4 to about 11 upon molding, the method comprising introducing into said composition an A-B-A triblock copolymer wherein A represents poly(2-alkyl-2-oxazoline) end blocks and B represents a polyisobutylene midblock, the A-B-A triblock copolymer being employed in an effective amount to improve the impact strength properties of the composition upon molding as compared to the impact strength properties of the composition in the absence of the A-B-A triblock copolymer.

Without intending to limit the invention to a particular theory of how the triblock copolymer impact modifier functions, it is believed to function via hydrogen bonding between the active hydrogen on the recurring units of the imide monomer in the thermoplastic copolymer and the heteroatoms of the poly(2-alkyl-2-oxazoline) end blocks of the triblock copolymer, hence coupling the polyisobutylene midblock. Moreover, it is believed that the unexpected transparency of the molded compositions of this invention is due to a morphology with a rubber (polyisobutylene) particle size of less than 0.2 microns.

Also according to this invention, there is also provided a moldable thermoplastic composition which comprises a blend of from about 70 to about 85 weight percent of an imide containing copolymer and from about 30 to about 15 weight percent of an A-B-A triblock copolymer, wherein:

(a) the imide containing copolymer comprises from about 50 to about 90 of mole percent recurring units of at least one first monomer selected from the group consisting of methyl methacrylate and vinyl aromatic monomers, from about 10 to about 50 mole percent recurring units of at least one maleimide monomer bearing an active hydrogen having a pKa value of from about 4 to about 11, and from 0 to about 25 mole percent recurring units of at least one vinyl copolymerizable monomer with the proviso that if a vinyl copolymerizable monomer is employed, then the vinyl copolymerizable monomer and the above said first monomer are selected to be different monomers; and (b) the A-B-A triblock copolymer comprises in weight percent from about 10 to about 35 poly(2-alkyl-2-oxazoline) end blocks and from about 65 to about 90 of a polyisobutylene midblock.

In one embodiment of this invention, the imide-containing copolymer may be a poly(acrylic-imide) copolymer of the type described in the Kopchik, U.S. Pat. No. 4,246,374 which is incorporated herein by reference.

Also, according to this invention there is provided a molded composition comprising a continuous phase and a disperse phase within the continuous phase, wherein:

(a) the disperse phase comprises the polyisobutylene midblock of an A-B-A triblock copolymer comprising in weight percent from about 10 to about 35 poly(2-alkyl-2-oxazoline) end blocks and from about 90 to about 65 polyisobutylene midblock; and (b) the continuous phase comprises (i) an imide containing copolymer comprising from about 50 to about 90 mole percent recurring units of at least one first monomer selected from the group consisting of methyl methacrylate and vinyl aromatic monomer, from about 10 to about 50 mole percent recurring units of at least one maleimide monomer bearing an active hydrogen having a pKa value of from about 4 to about 11, and from 0 to about 25 mole percent recurring units of at least one vinyl copolymerizable monomer with the proviso that if a vinyl copolymerizable monomer is employed, then the vinyl copolymerizable monomer and the above first monomer are selected to be different monomers; and (ii) the poly(2-alkyl-2-oxazoline) end blocks of said A-B-A triblock copolymer, wherein said molded composition comprises a blend of from about 70 to about 85 weight percent of said imide containing copolymer and from about 30 to about 15 weight percent of said A-B-A triblock copolymer.

The imide containing copolymer employed in this invention will comprise from about 50 to about 90 mole percent of methyl methacrylate and/or vinyl aromatic monomer and from about 10 to about 50 mole percent of a maleimide monomer.

Suitable vinyl aromatic monomers include styrene, p-methylstyrene, p-t-butylstyrene, dibromostyrene, alpha-methylstyrene, and the like, and their mixtures.

Suitable maleimide monomers are those bearing an active hydrogen having a pKa value of from about 4 to about 11. Particularly suitable maleimide monomers include maleimide, N-(p-hydroxyphenyl) maleimide, N-(p-carboxyphenyl) maleimide, and the like, and their mixtures.

Optionally, the imide containing copolymer may also comprise from 0 to about 25 mole percent of a suitable polymerizable vinyl monomer selected so as to be different from the vinyl aromatic monomer selected. Particularly suitable polymerizable vinyl monomers include the vinyl aromatic monomers written above, maleic anhydride, acrylonitrile, methyl methacrylate, N-methylmaleimide, N-ethylmaleimide, N-arylmaleimide (e.g., N-phenylmaleimide), N-tribromophenylmaleimide, and the like and their mixtures.

These maleimide monomers listed as suitable for use as vinyl polymerizable monomers do not bear active hydrogens having pKa values within the range of about 4 to about 11.

The number average molecular weight (Mn) of the imide containing copolymer as measured by gel permeation chromatography should be from about 90,000 to about 350,000, most preferably from about 150,000 to about 240,000.

The triblock copolymer of this invention will comprise from about 10 to about 35 percent by weight poly(2-alkyl-2-oxazoline) end blocks and from about 65 to about 90 percent by weight polyisobutylene midblock.

Suitable poly(2-alkyl-2-oxazoline) end blocks include poly(2-methyl-2-oxazoline), poly(2-ethyl-2-oxazoline), poly(2-propyl-2-oxazoline), and other poly(2-alkyl-2-oxazoline) polymers. U.S. Pat. No. 3,640,909 which is incorporated by reference teaches the preparation of suitable poly(2-alkyl-2-oxazoline) polymers.

The number average molecular weight (Mn) of the poly(2-alkyl-2-oxazoline) end blocks should be from about 12,000 to about 30,000, and the number average molecular weight of the polyisobutylene midblock should be from about 50,000 to about 100,000.

The moldable compositions of this invention will comprise from about 70 to about 85 percent by weight of the imide-containing copolymer described above and from about 15 to about 30 percent by weight of the triblock copolymer described above.

The thermoplastic moldable compositions of this invention can also include other ingredients such as extenders, processing aids, pigments, anti-oxidants, stabilizers, mold release agents and the like, for their conventionally employed purpose. Fillers in amounts sufficient to impart reinforcement or property modification can also be added, such as silica, calcium carbonate, talc, mica, processed mineral fibers, titanium dioxide, potassium titanate and titanate whiskers, carbon fibers, aramid fibers, glass flakes, glass spheres, chopped glass fibers, and the like, and their mixtures.

Evaluation of material properties was performed based on the following ASTM standard tests: flexural modulus (D-790), tensile strength (D-638), elongation (D-638), notched Izod (D-256), Vicat Index (D-1525), Transmittance of Visible Light (D-1494), and DTUL (deflection temperature under load, ⅛" at 264 psi (D-648). Gardner falling weight index was established using a 1¼" diameter orifice and an 8 pound ½" diameter weight. Glass transition temperature was determined by two methods—differential scanning colorimetry (DSC) and dynamic mechanical analysis (DMA).

The following examples serve to demonstrate the invention.

EXAMPLE 1

This example demonstrates the preparation of a styrene/maleimide copolymer usable in this invention.

Styrene monomer (100 grams) and maleimide monomer (93 grams) were dissolved in 100 grams of dimethylacetamide at 35° C. To the monomer solution was added 0.65 gram of VAZO ® 67 free radical initiator (E. I. DuPont Company). The reaction was heated to 75° C. for 4.5 hours. The resulting polymer mass was dissolved in tetrahydrofuran and precipitated into methanol. The overall conversion of monomer to polymer was 186 grams (96.3%). The recovered styrene/maleimide copolymer was analyzed and found to contain 7.0 weight % nitrogen which corresponds to 48.5 weight % maleimide comonomer content in the copolymer. The copolymer has a Tg of 259° C., an inherent viscosity in dimethylacetamide of 3.54 and a number average molecular weight as measured by gel permeation chromatography of 202,100.

EXAMPLE 2

This example demonstrates the interaction of the styrene/maleimide copolymer produced in Example 1 and poly(2-ethyl-2-oxazoline) (PEOx) polymer [XAS-10874, Dow Chemical Company]. Comparisons of glass transition behavior, inherent viscosity, infrared spectroscopy, and $N^{15}$ NMR spectroscopy for the two components and their blends are shown in following Table 1.

TABLE 1

| | | | | | | |
|---|---|---|---|---|---|---|
| S/MI (Example 1) | 100 | 80 | 60 | 40 | 20 | 0 |
| PEOx (XAS-10874) | 0 | 20 | 40 | 60 | 80 | 100 |
| Tg (°C., DSC) | 259 | 192 | 184 | 180 | 170 | 59 |
| ηInh (dl/g) | 3.54 | 5.17 | 5.95 | 6.41 | 7.21 | 1.84 |
| Infrared Spectroscopy | 3096, | — | 2857, | — | 2910, | — |
| Imide Hydrogen Frequency (cm$^{-1}$) | 3175 | | 2996 | | 3050 | |
| $N^{15}$ NMR (δ, ppm) | | | | | | |
| imide nitrogen | 171.1 | — | 180.1 | — | 179.3 | — |
| amide nitrogen | — | — | 122.5 | — | 123.1 | 130 |

The glass transition temperature data indicates that the styrene/maleimide copolymer was thermodynamically miscible, i.e., fully compatible with the poly(2-ethyl-2-oxazoline) in all proportions. The inherent viscosity values for the blends were higher than either the two components and indicate the presence of some degree of chain extension. The spectroscopic data support the existence of a hydrogen bonding interaction between the imide hydrogen on the styrene/maleimide copolymer and the heteroatoms which are part of the poly(2-ethyl-2-oxazoline) polymer.

EXAMPLE 3

In this example, seven imide containing copolymers of different levels of maleimide monomer were blended with poly(2-ethyl-2-oxazoline) to demonstrate the relationship between mole % maleimide content and miscibility with the poly(2-ethyl-2-oxazoline) (PEOx) polymer. The results are shown in following Table 2.

TABLE 2

| Polymer No. | Mole % MI | Tg(°C.) of S/MI | Tg (°C.) of S/MI:PEOx 50:50 Wt. % Blend |
|---|---|---|---|
| S/MI 1 | 5.1 | 120 | 59,119 |
| S/MI 2 | 8.8 | 128 | 62,119 |
| S/MI 3 | 10.5 | 134 | 81 |
| S/MI 4 | 16.3 | 146 | 90 |
| S/MI 5 | 23.1 | 168 | 119 |
| S/MI 6 | 34.2 | 218 | 147 |
| S/MI 7 | 48.2 | 259 | 183 |

EXAMPLE 4

This example serves to demonstrate the preparation of an A-B-A triblock copolymer impact modifier of this invention, poly(2-ethyl-2-oxazoline)-b-polyisobutylene-b-poly(2-ethyl-2-oxazoline).

A pressure tube was charged with 48 grams of dichloromethane and 32 grams of monochlorobenzene. Next, 1,4-Bis ($\alpha,\alpha$-dimethylchloromethyl) benzene [0.087 gram, 0.38 mmole] and isobutylene (24.9 grams, 446 mmoles) were added, and the tube was cooled to $-55°$ C. with the aid of an n-octane/nitrogen cooling bath. Boron trichloride (1.33 mmoles) dissolved in 10 milliliters of dichloromethane was added to the pressure tube and an exotherm to $-48°$ C. ensued. The reaction temperature was held at $-55°$ C. for three hours, at which time methanol was added to quench the reaction. Conversion of monomer to polymer was 42%. The difunctional polyisobutylene exhibited a number average molecular weight (Mn) by gel permeation chromatography of 67,400 with a polydispersity of 1.4. The $\alpha,\omega$-di(t-chloro)polyisobutylene was dissolved in n-heptane, precipitated into methanol and dried at 80° C. for 14 hours. The $\alpha,\omega$-di(t-chloro)polyisobutylene was dissolved in n-pentane and subjected to vacuum devolatilization.

The $\alpha,\omega$-di-(t-chloro)polyisobutylene was dissolved in a 75:25 solvent mixture of dichloromethane: monochlorobenzene so as to prepare a 45% solids solution. The solution was cooled to 15° C. and dry 2-ethyl-2-oxazoline (4.2 grams, 42.4 mmoles) was added. Next, a solution of diethylaluminum chloride ($1.1 \times 10^{-3}$ mmole) was added, and the reaction stirred at 25° C. for about 22 hours and then one milliliter of methanol was added. The resulting A-B-A triblock copolymer was recovered by precipitation into isopropanol. The conversion of 2-ethyl-2-oxazoline to poly(2-ethyl-2-oxazoline) was 90%. The GPC number average molecular weight (Mn) of the A-B-A triblock copolymer was 90,400 with a polydispersity of 1.6. The physical properties of the A-B-A triblock copolymer were evaluated and are shown in Table 3.

TABLE 3

| Tg (°C., DMA) | |
|---|---|
| polyisobutylene mid block | −61 |
| poly(2-ethyl-2-oxazoline) end block | 53 |
| Tensile Strength (psi) | 3760 |
| Elongation (%) | 430 |

EXAMPLE 5

In this example, the physical properties of a moldable composition of this invention prepared by blending 78% by weight of the styrene/maleimide copolymer prepared according to the procedure of Example 1 and 22% by weight of a poly(2-ethyl-2-oxazoline) A-B-A triblock copolymer prepared according to the procedure of Example 4 are demonstrated.

The physical properties of the composition were determined from injection molded test specimens and are listed in following Table 4.

TABLE 4

| | |
|---|---|
| Tg (°C., DSC) | 201 |
| DTUL (⅛", °F.) | 313 |
| Vicat (°C.) | 200 |
| Tensile Strength (psi) | 6750 |
| Elongation (%) | 47 |
| Flexural Modulus (psi) | 373,400 |
| Notched Izod (ft-lbs/in) | 4.8 |
| Falling Weight Index (in-lbs) | 156 |
| Tensile Impact (ft-lbs/in2) | 248 |
| after 500 hrs. at 105° C. | 207 |
| after 500 hrs. UV exposure | 221 |
| after 100 hrs. in boiling water | 213 |
| % Transmittance Visible Light | 91 |
| % Transmittance Visible Light after 100 hrs. in boiling water | 88 |

EXAMPLE 6

This example serves to demonstrate the use of an A-B-A triblock copolymer of this invention to impact modify a styrene/maleimide/N-phenylmaleimide terpolymer.

The styrene/maleimide/N-phenylmaleimide terpolymer was prepared as follows. Styrene monomer (100 grams), maleimide monomer (46.6 grams), and N-phenylmaleimide monomer (83.1 grams) were dissolved in 100 grams of dimethylacetamide at 35° C. To this solution was added 0.65 gram of VAZO ® 67 free radical initiator. The reaction was heated to 77° C. for 4.5 hours. The resulting polymer mass was dissolved in tetrahydrofuran and precipitated into methanol. The overall conversion of monomer to polymer was 208 grams (91%). The terpolymer exhibited a Tg of 239° C., an inherent viscosity in dimethylacetamide of 3.25 and a number average molecular weight as measured by gel permeation chromatography of 174,300.

The interaction of the styrene/maleimide/N-phenylmaleimide copolymer with the poly(2-ethyl-2-oxazoline) polymer was verified by blending in a Brabender mixing apparatus, 25 grams of the styrene/maleimide/N-phenylmaleimide copolymer prepared as described above and 25 grams of poly(2-ethyl-2-oxazoline) polymer [XAS-10874] at 280° C. for five minutes. The glass transition temperature of the blend as measured by DSC was 161° C. indicating a high degree of molecular mixing.

Next, a moldable composition of the invention was prepared by blending 80% by weight of the styrene/maleimide/N-phenylmaleimide terpolymer prepared in this example, and 20% by weight of the A-B-A triblock copolymer prepared according to the procedure of Example 4. The physical properties of the molded composition were determined from injection molded test specimens and are shown in following Table 5.

TABLE 5

| | |
|---|---|
| Tg (°C., DSC) | 191 |
| DTUL (⅛", °F.) | 302 |
| Tensile Strength (psi) | 6450 |
| Flexural Strength (psi) | 382,300 |
| Notched Izod (ft-lbs/in) | 6.1 |
| % Transmittance Visible Light | 86 |

EXAMPLE 7

This example serves to demonstrate the use of an A-B-A triblock copolymer impact modifier of this invention to impact modify a styrene/maleimide/maleic anhydride terpolymer and produce a moldable composition of this invention.

A styrene/maleimide/maleic anhydride terpolymer was prepared as follows. Styrene monomer (100 grams), maleimide monomer (69.6 grams), and maleic anhydride monomer (23.5 grams) were dissolved in 100 grams of dimethylacetamide at 35° C. To the resulting solution was added 0.65 gram of VAZO ® 67 free radical initiator. The reaction was heated to 77° C. for 4.5 hours. The resulting polymer mass was dissolved in tetrahydrofuran and precipitated into methanol. The overall conversion of monomer to polymer was 166 grams (86%). The copolymer exhibited a Tg of 245° C., an inherent viscosity in dimethylacetamide of 3.03 and a number average molecular weight of 168,500. The terpolymer contained 34% by weight maleimide monomer as determined by elemental nitrogen analysis and 12% by weight maleic anhydride as determined by KOH titration.

The interaction of the styrene/maleimide/maleic anhydride terpolymer with the poly(2-ethyl-2-oxazoline) polymer was verified by blending in a Brabender mixing apparatus, 25 grams of the styrene/maleimide/maleic anhydride copolymer prepared as described above and 25 grams of poly(2-ethyl-2-oxazoline) polymer [XAS-10874] at 280° C. for five minutes. The glass transition temperature of the blend as measured by DSC was 164° C. indicating a high degree of molecular mixing.

A moldable composition of this invention was prepared by blending 80% by weight of the styrene/maleimide/maleic anhydride copolymer prepared in this example and 20% by weight of the A-B-A triblock copolymer produced according to Example 4. The physical properties of the molded composition were determined from injection molded test specimens and are shown in following Table 6.

TABLE 6

| | |
|---|---|
| Tg (°C., DSC) | 193 |
| DTUL (⅛", °F.) | 305 |
| Tensile Strength (psi) | 6740 |
| Flexural Strength (psi) | 379,400 |
| Notched Izod (ft-lbs/in) | 5.4 |
| % Transmittance Visible Light | 92 |

It will be evident from the foregoing that various modifications can be made to this invention. Such, however, are considered as being within the scope of the invention.

What is claimed is:

1. An A-B-A triblock copolymer wherein each A separately represents a poly(2-alkyl-2-oxazoline) end block and B represents a polyisobutylene midblock.

2. Poly(2-methyl-2-oxazoline)-b-polyisobutylene-b-poly(2-methyl-2-oxazoline).

3. Poly(2-ethyl-2-oxazoline)-b-polyisobutylene-b-poly(2-ethyl-2-oxazoline).

4. Poly(2-propyl-2-oxazoline)-b-polyisobutylene-b-poly(2-propyl-2-oxazoline).

5. The A-B-A triblock copolymer of claim 1 which comprises in weight percent from about 10 to about 35 of said poly(2-alkyl-2-oxazoline) end blocks and about 90 to about 65 of said polyisobutylene midblock.

6. The A-B-A triblock copolymer of claim 1 in which the number average molecular weight (Mn) of the poly(2-alkyl-2-oxazoline) end blocks is from about 12,000 to about 30,000.

7. The A-B-A triblock copolymer of claim 1 in which the number average molecular weight (Mn) of the polyisobutylene midblock is from about 50,000 to about 100,000.

8. An impact strength modifier for moldable thermoplastic compositions which comprise at least one copolymer having recurring units of an imide monomer bearing an active hydrogen having a pKa value of from about 4 to about 11, said impact strength modifier being an A-B-A triblock copolymer wherein each A separately represents poly(2-alkyl-2-oxazoline) end block and B represents a polyisobutylene midblock.

9. The impact strength modifier of claim 8 in which said A-B-A triblock copolymer comprises in weight percent from about 10 to about 35 of said poly(2-alkyl-2-oxazoline) end blocks and from about 90 to about 65 of said polyisobutylene midblock.

* * * * *